US005796913A

United States Patent [19]

Takada et al.

[11] Patent Number: 5,796,913

[45] Date of Patent: Aug. 18, 1998

[54] VIDEO DISK AND VIDEO REPRODUCTION DEVICE WHICH AUTOMATICALLY EXTRACTS REPRODUCTION CONTROL DATA FROM A DISK AND SUBSEQUENTLY MODIFIES A CONTROL PROGRAM WHICH WAS STORED IN A ROM

[75] Inventors: Hiroyuki Takada, Haguri-gun; Koichi Hayashi, Nagoya; Yasutada Aoyama, Inazawa; Norio Chaya; Hiroshi Nishikawa, both of Nagoya, all of Japan

[73] Assignee: Brother Kogyo Kabushiki Kaisha, Nagoya, Japan

[21] Appl. No.: 777,061

[22] Filed: Dec. 30, 1996

Related U.S. Application Data

[63] Continuation of Ser. No. 378,354, Jan. 25, 1995, abandoned.

[30] Foreign Application Priority Data

Jan. 26, 1994 [JP] Japan .................................. 6-007072

[51] Int. Cl.$^6$ .............................. H04N 5/781; H04N 5/85; G11B 15/18; G11B 17/00

[52] U.S. Cl. .............................. 386/125; 386/70; 360/69; 434/307 A

[58] Field of Search .................................. 386/1, 45, 95, 386/125, 126, 70; 348/7, 13; 360/27, 69; 395/712, 651, 652; 434/307 A

[56] References Cited

U.S. PATENT DOCUMENTS 4,305,131 12/1981 Best .......................................... 364/521
5,233,438 8/1993 Funahashi et al. .
5,252,775 10/1993 Urano .......................................... 84/645
5,270,831 12/1993 Parulski et al. .......................... 358/403
5,351,132 9/1994 Sawabe et al. .......................... 358/342
5,353,121 10/1994 Young .......................................... 348/563
5,414,455 5/1995 Hooper et al. .............................. 348/7
5,473,106 12/1995 Miyashita .................................. 84/609
5,476,303 12/1995 Suzuki et al. .......................... 360/72.2
5,481,713 1/1996 Wetmore et al. ........................ 395/700
5,497,241 3/1996 Ostrover et al. ........................ 358/341
5,546,586 8/1996 Wetmore et al. ........................ 395/700
5,561,649 10/1996 Lee et al. .................................. 369/47
5,589,947 12/1996 Sato et al. .................................. 386/96

FOREIGN PATENT DOCUMENTS

0265167 A 4/1988 European Pat. Off. .

OTHER PUBLICATIONS

Lougher, Communications Support for Multimedia Workstations 1991, pp. 67–72.

Lougher, The Design of a Storage Sewer for Continuous Media, Computer Journal Oct. 92, 1992 pp. 32–42.

Lougher The Input of Digital Audio & Video on High-Speed Storage IEEE '94 pp. 84–89.

*Primary Examiner*—Tommy P. Chin
*Assistant Examiner*—David R. Vincent
*Attorney, Agent, or Firm*—Oliff & Berridge, PLC

[57] ABSTRACT

A CPU 38 retrieves the reproduction control program from a header portion of a video disk. The CPU stores the program into a RAM 35. The CPU controls disk players **34*a* and 34*b* to reproduce video data from video disks, based on the program stored in a ROM 33 and the reproduction control program now stored in the RAM 35**.

10 Claims, 6 Drawing Sheets

VIDEO DISK AND VIDEO REPRODUCTION DEVICE WHICH AUTOMATICALLY EXTRACTS REPRODUCTION CONTROL DATA FROM A DISK AND SUBSEQUENTLY MODIFIES A CONTROL PROGRAM WHICH WAS STORED IN A ROM

This is a Continuation of application Ser. No. 08/378,354 filed Jan. 25, 1995, now abandoned.

BACKGROUND OF THE INVENTION

1. Field of the Invention

The present invention relates to a video disk for storing video data and to a video reproduction device for reproducing video data from the video disk. More particularly, the present invention relates to a video disk for storing video data for forming background videos of a karaoke system and to a video reproduction device for reproducing the video data from the video disk.

2. Description of the Related Art

An image karaoke system is for playing accompaniment music of a song to be sung while displaying the song lyrics superimposed on a background image. Conventionally, there has been known an image karaoke system which reproduces from a video disk the video data, lyric data, and music data of each song desired to be sung. Because data for several thousand songs must be stored in each device, an establishment which provides an image karaoke system for its customers must keep an extremely large number of video disks on hand. A special video disk housing case is provided to the image karaoke system for, housing several video disks. An autochanger is provided for changing the video disks according to a request by a user of the karaoke system. The space taken up by the autochanger and the special housing case has given rise to a need for a more compact device, especially in establishments that provide karaoke for customers.

U.S. Pat. No. 5,233,438 has proposed a more compact device for solving the above problem, wherein video data is stored separately from song data. While the song music is played, a background video formed based on the video data is displayed with the lyrics superimposed on the background image. The video data for the background image is stored in video disks. A video reproduction device is provided for reproducing the background image from the video disks. The video reproduction device has a read-only memory (ROM) for storing a program for controlling reproduction of the images. A microprocessor installed in the video reproduction device reproduces images based on the program.

SUMMARY OF THE INVENTION

However, some times bugs which are overlooked or which later generate in the program are discovered after the video reproduction device is sold and delivered to a user. In these cases, it is necessary to replace the ROM with a new one that stores a corrected program.

It is preferable that modifications to and addition of new functions to the reproduction control program be possible, even after the sale of the device.

For example, images are reproduced in the karaoke system by switching alternately between two video disks at a predetermined switching interval. At some point changing the switching interval might be desired. The karaoke system employs video disks that store a plurality of 30 second video units or chapters. The order in which the video units are reproduced from the video disks might require rearranging to a more desirable order. In order to perform these modifications, however, it is necessary to replace the presently-installed ROM with a new one that stores the modified reproduction manner.

Some video disks are produced with video units classified in several image genres that reflect the content or gist of different types of karaoke songs. When a karaoke song is selected, the video reproduction device determines an image genre appropriate for the selected song and retrieves video units of the determined image genre from the video disks. If the standard used for classifying image genres of the video units is different from that used for determining the image genre for the selected song, the atmosphere of the retrieved video units will fail to match the content of the selected song. It is therefore preferable that the standard used in the device for determining the image genre for the selected song can be modified or corrected so as to agree with the standard that was used for preparing the video units. Because the program for determining the image genre for the selected song is stored in the ROM, this ROM has to be replaced with a new one stored with a program that achieves this modification.

In order to replace the ROM, the entire image reproduction device has to be brought back to the manufacturer, or a maintenance person must be sent to the user. Accordingly, this replacing operation wastes time, labor, and expense.

This problem can conceivably be solved by constructing the device and the ROM so that users can easily replace the ROM with a new one. However, users may fail to correctly engage the new ROM in the device. This might reduce durability of or damage connecting parts.

It is therefore an object of the present invention to solve these problems, and to provide a video disk and a video reproduction device wherein the originally-stored control program can be easily corrected and modified.

In order to attain the above object and other objects, the present invention provides a video disk for storing video images, comprising: a first part for storing video data representative of video images; and a second part for storing program data representing a manner of reproducing the video data from the first part. The program data may represent a reproduction pattern in which the video data is desired to be reproduced from the video disk. The video data may represent a plurality of video units each being edited into a predetermined time period video. The program data may represent information on a genre classifying manner in which the plurality of video units are classified in several genres. The program data may represent a manner of selecting several video units of a desired genre out of the plurality of video units, based on the genre classifying manner.

According to another aspect, the present invention provides a video reproduction device for reproducing video data from a video disk, the video disk storing the video data and a reproduction control program data representative of a desired reproduction manner in which the video data is desired to be reproduced from the video disk, the device comprising: disk reproduction means for retrieving video data from a video disk set thereon, the video disk storing the video data and a reproduction control program data representative of a desired reproduction manner in which the video data is desired to be reproduced from the video disk; a program read-only memory for storing in advance a control program for controlling the disk reproduction means; a program read/write memory in which a program can be written in and read from; a program writing unit for retrieving the reproduction control program data from the video disk and for storing the reproduction control program data into the program read/write memory; and control means for controlling the disk reproduction means, based on both the control program stored in the program read-only memory and the reproduction control program data stored in the program read/write memory, so as to retrieve the video data from the video disk in the desired reproducing manner represented by the reproduction control program data.

The control program stored in the program read-only memory may be formed with a program path which enters the reproduction control program data stored in the program read/write memory, the control means executing the control program stored in the program read-only memory, thereupon executing the reproduction control program data stored in the program read/write memory.

The reproduction control program data may represent a reproduction pattern in which the video data is desired to be reproduced from the video disk, the control means controlling the disk reproduction means based on the reproduction control program data written in the program read/write memory, so as to retrieve the video data from the video disk in the desired reproducing pattern.

The video data may represent a plurality of video units each being edited into a predetermined time period video. The reproduction control program data may represent information on a genre classifying manner in which the plurality of video units are classified into several genres, the control means controlling the disk reproduction means based on the reproduction control program data written in the program read/write memory, so as to reproduce several video units of a desired genre that is determined based on the genre classifying manner. The reproduction control program data may represent a manner of selecting the several video units of the desired genre out of the plurality of video units, based on the genre classifying manner.

According to a further aspect, the present invention provides a method for reproducing video data from a video disk, the video disk storing the video data and a reproduction control program data representative of a desired reproduction manner in which the video data is desired to be reproduced from the video disk, the method comprising the steps of: retrieving the reproduction control program data from the video disk; and retrieving video data from the video disk, based on the retrieved reproduction control program data, so as to retrieve the video data from the video disk in the desired reproducing manner represented by the reproduction control program data.

The video data may be retrieved from the video-disk with a video reproduction device, the video reproduction device including a disk player, a program read-only memory for storing in advance a control program for controlling the disk player, and a program read/write memory in which a program can be written in and read from. The reproduction control program data retrieving step may include the steps of: locating a video disk on the disk player; controlling the disk player to retrieve the reproduction control program data from the video disk; and storing the reproduction control program data into the program read/write memory. The video data retrieving step may include the step of controlling the disk player to retrieve video data from the video disk set thereon, based on both the control program stored in the program read-only memory and the reproduction control program data presently stored in the program read/write memory, so as to retrieve the video data from the video disk in the desired reproducing manner represented by the reproduction control program data.

BRIEF DESCRIPTION OF THE DRAWINGS

The above and other objects, features and advantages of the invention will become more apparent from reading the following description of the preferred embodiments taken in connection with the accompanying drawings in which.

DETAILED DESCRIPTION OF THE INVENTION

Figure 1:
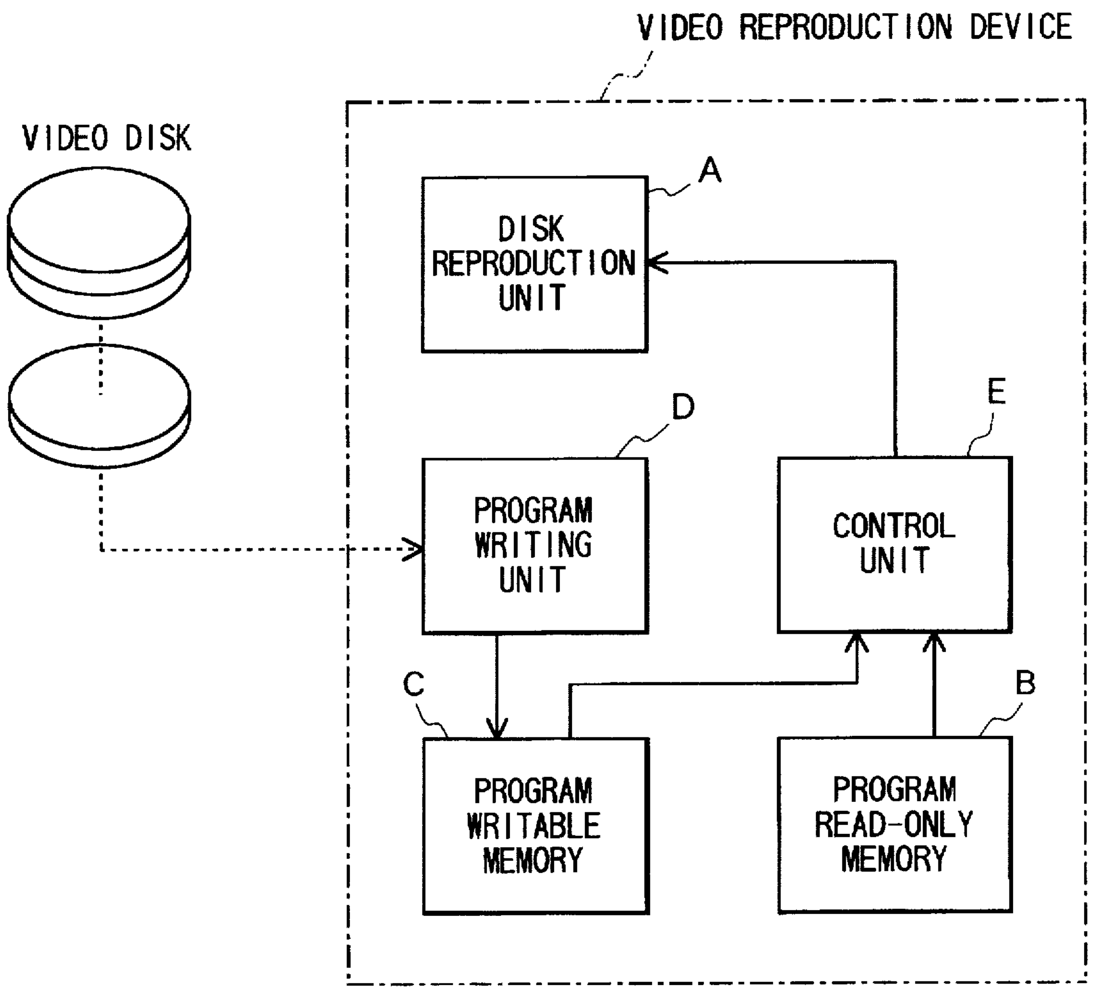
FIG. 1 is a block diagram showing a basic structure of a video reproduction device according to a preferred embodiment of the present invention.

An embodiment of a video disk and a video reproduction device according to the present invention will be described below while referring to the accompanying drawings wherein like parts and components are designated by the same reference numerals to avoid duplicating description.

According to the present invention, a video disk stores not only video data but also a reproduction control program desired to be conducted by a video reproduction device.

As shown in FIG. 1, a video reproduction device of the present invention includes: a disk reproduction unit A; a program read-only memory B; a memory C in which programs can be written into and retrieved from; a program writing unit D; and a control unit E. The unit A is for retrieving video data from the video disk set on the unit. The read-only memory B is for storing a control program for controlling the disk reproduction unit A. The program writing unit D is for retrieving the reproduction control program from the video disk and storing it into the memory C when the reproduction device is started. The control unit E is for controlling the reproduction unit A, based on the control programs stored in the memories B and C, so as to retrieve video data from the video disk. The control program stored in the read-only memory B includes routine that always executes the program stored in the memory C. This routine structure combines the program in the memory B and the program written in the memory C.

The reproduction control program stored in the video disk may determine reproduction speed, reproduction pattern, or other reproduction parameter. The reproduction pattern may be directed to the disk switching time interval or the reproduction order for reproducing the video units from the video disk, for example. The reproduction control program may also represent information on the manner in which the video units have been classified into image genres in the video disk.

The video disk and the video reproduction device of the present invention can be applied to a karaoke system. In this case, decreasing the disk switching interval provides a greater variety of background images. Changing the reproduction order from a predetermined order to a random order also provides a greater variety of background images. Changing or correcting the image genre determining manner so that it agrees with the image genre classifying manner or standard used in the video disks can insure that background images match the atmosphere of the songs well. This enables the device to reproduce proper background images from any kind of video disk.

According to the present invention, these modifications can provide any desired additional function and can also correct any bugs present in programs originally stored in the device.

As explained above, these modifications can be easily attained by simply setting in the device a video disk that stores the reproduction control program for modifying the program. This simple modification is useful in filling the demand for more compact devices.

Below will be given an example of an image karaoke system to which are applied the video disks and the video reproduction device of the present invention.

Figure 2:
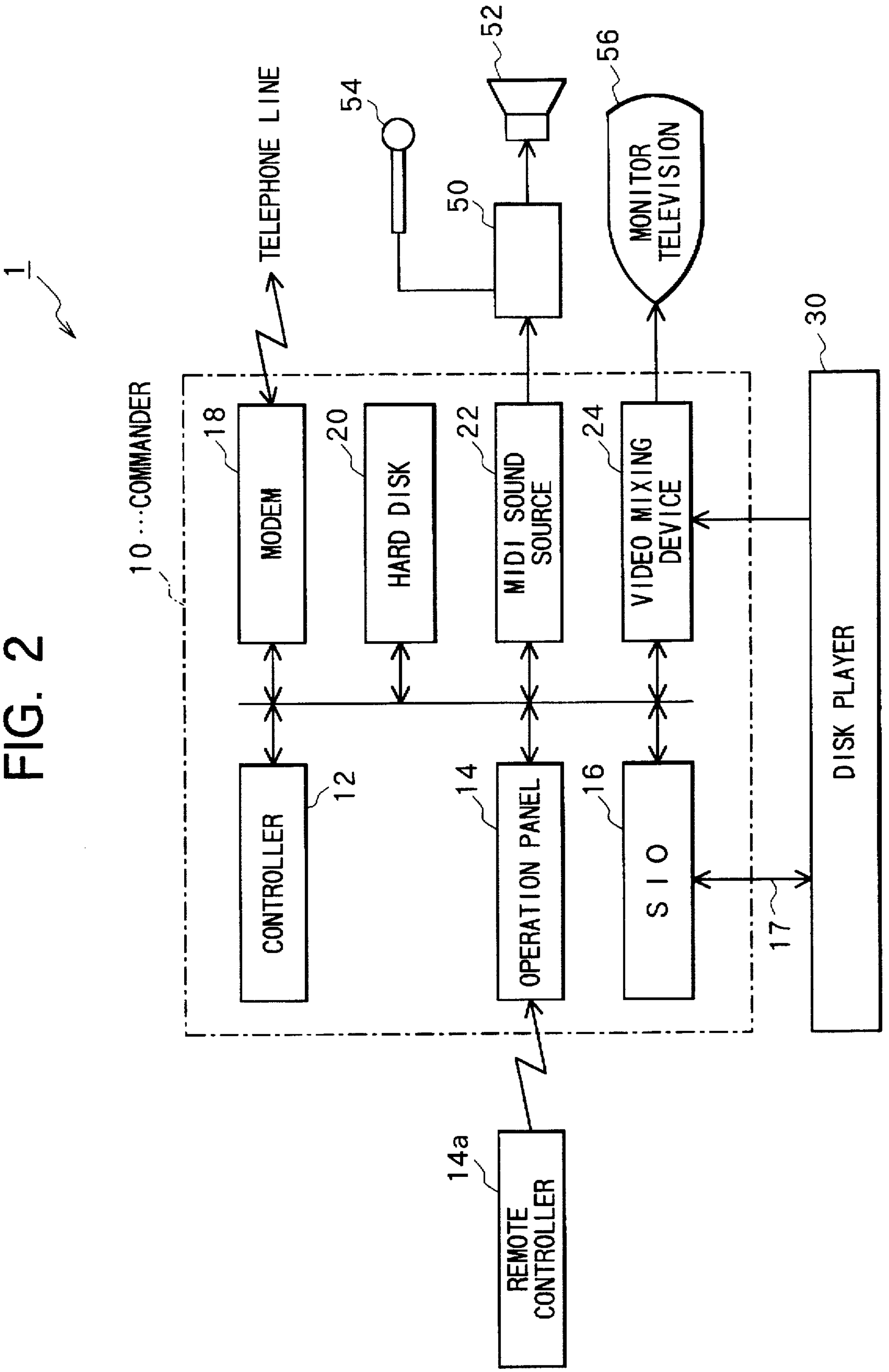
FIG. 2 is a block diagram showing a structure of a karaoke system applied to which the present invention.

As is shown in FIG. 2, the image karaoke system 1 of the example includes a commander 10, a disk player device 30, an amplifier/mixer 50, a speaker 52, a microphone 54, and a monitor television 56. The disk player device 30 is an example of the video reproduction device of the present invention.

As shown in FIG. 2, the commander 10 includes an operation panel 14, a serial input-output circuit (SIO) 16, a modem 18, a hard disk 20, a MIDI sound source 22, a video mixer 24, and a controller 12 mutually interconnected by a bus line.

The operation panel 14 is for selecting a song desired to be sung by the user, and for adjusting, for example, echo, volume, tone, balance between music and voice volume, and volume of music. The operation panel 14 is provided with a remote control unit 14a so that a user can select music and perform other operations at a distance from the operation panel 14.

The serial input-output circuit (SIO) 16 is connected to the disk player device 30. The serial input-output circuit 16 is an interface circuit for transmitting information on image genre appropriate to the selected song to the disk player device 30 via a serial transmission line 17. In the present embodiment an RS232C cable is used for the transmission line 17.

The modem 18 is a modulation-demodulation unit connected to a telephone line. The modem 18 is for modulating signals sent to an external device (host computer) transmitted through, and for demodulating a signal received through, a transmission path via the telephone line. An example of a signal modulated by the modem 18 would be a signal containing information on types and frequency of songs requested by users. An example of a signal demodulated by the modem 18 would be a signal containing new song data, for continuously providing the karaoke system 1 of the present embodiment with new song data, sent during the night from the host computer to the commander 10 via the telephone line. The demodulated signal would then be stored in the hard disk 20.

The hard disk 20 is a memory unit for storing song data of a plurality of karaoke songs selectable by the user to be sung. The song data for each of the plurality of karaoke songs includes music data and lyric data. The music data is in the form according to a musical instrument digital interface (MIDI) standard.

The MIDI sound source 22 is connected to the amplifier/mixer 50 and is for storing musical sounds of various instruments. The MIDI sound source 22 is a sound source for producing music signals of various instruments based on the music data sent from the hard disk 20. The MIDI sound source 22 sends instrument music signal produced therein to the amplifier/mixer 50.

The video mixer 24 is connected to the disk player device 30 and the television monitor 56. The video mixer 24 is for superimposing lyric data sent from the hard disk 20 onto an NTSC image signal sent from the disk player device 30. The video mixer 24 tints lyrics that are displayed on the monitor television 56 in synchronization with output of the instrumental music so that the user knows which part of the music is being played.

The controller 12 is a microcomputer for controlling the entire commander 10. The controller 12 performs various controls such as, determining an image genre appropriate to the selected song, transmitting information on the image genre to the disk player device 30, consecutively retrieving the music data and lyric data for the selected song from the hard disk 20 according to the progress of the music of the song, and sending lyric data to the video mixer 24 and song data to the MIDI sound source 22.

Figure 3:
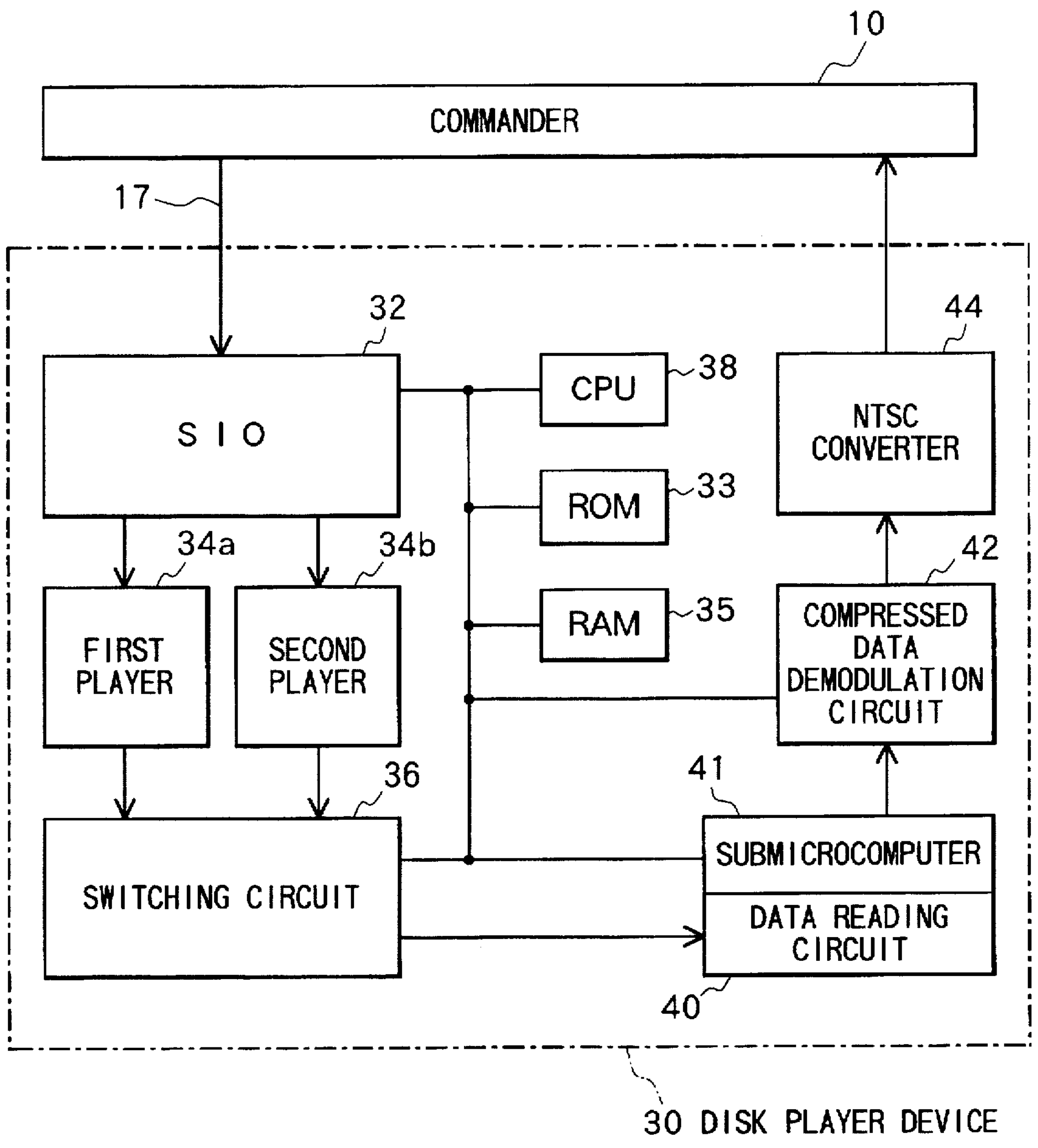
FIG. 3 is a block diagram showing a structure of a disk player device according to the embodiment of the present invention.

Next, an explanation will be provided for the disk player device 30 while referring to FIG. 3. The disk player device 30 is for transmitting, to the commander 10, NTSC video signals of video of an image genre corresponding to the selected karaoke song, the information of which has been sent from the commander 10. As will be described below, the disk player device 30 reproduces video disks of the present invention to produce the video signals.

The disk player device 30 includes a serial input/output circuit (SIO) 32, a first disk changeable player (referred to as a "first player," hereinafter) 34*a*, a second disk changeable player (referred to as a "second player," hereinafter) 34*b*, a switch circuit 36, a read-only memory (ROM) 33, a random access memory (RAM) 35, CPU 38, a data reading circuit 40, a compressed data demodulation circuit 42, and a NTSC convertor 44.

The serial input/output circuit (SIO) 32 is an interface circuit for receiving the information on the image genre appropriate for the selected song sent from the commander 10.

The first and second players 34*a* and 34*b* are both connected to the serial input/output circuit 32. The first and second players 34*a* and 34*b* are for selecting and reproducing chapters of the image genre appropriate for the selected song, as will be described later. Each of the first and second players 34*a* and 34*b* includes a changer portion and a player portion (both not shown) Both the changer portion and the player portion are well known. The changer portion houses ten image reproduction disks (not shown). The changer portion selects, out of the ten disks, one reproduction disk that stores chapters of respective image genres with desired amounts. The player portion is for playing an image reproduction disk thus selected and set on the player portion.

The video disks used in the present embodiment are the size of a 12 cm compact disk (CD). Video data is stored in each of the image reproduction disks in compressed form according to Moving Picture Image Coding Experts Group (MPEG) standards. Because the video data is in compressed form, each CD size disk contains one hour of images. The video data stored in each video disk represents a plurality of separate video units, each video unit being a video of 30 seconds long, for example. This 30-second video unit is referred to as "chapter," in the present specification. The chapters are edited separately so that no particular story or plot connects these plural chapters. The plural chapters are classified into several image genres corresponding to several content or gist, into which a plurality of karaoke songs are categorized. For example, the plural chapters are classified into image genre appropriate for songs with summer seasonal theme, image genre appropriate for songs with winter seasonal theme, and image genre appropriate for songs with spring or fall seasonal theme.

According to the present invention, the video disk has a header portion, in which program data (which will be described later) is stored.

The switching circuit 36 is a circuit connected to the first player 34*a* and the second player 34*b* for switching between transmission from the first player 34*a* and transmission from the second player 34*b* of video in the compressed form to the data reading circuit 40. For example, the switching circuit 36 performs to switch the players 34*a* and 34*b* in alternation at a fixed time interval (30 seconds, for example) while each player reproducing the chapters of the desired genre, in a predetermined order.

The data reading circuit 40 includes a sub-microcomputer 41 and is for reading, as digital data, the compressed image data sent from the switching circuit 36. The digital data read by the data reading circuit 40 is sent to the compressed data demodulation circuit 42. The compressed data demodulation circuit 42 is an electrical circuit for demodulating the compressed digital data sent from the data reading circuit 40 into an image signal. The video signal thus demodulated by the compressed data demodulation circuit 42 is sent to the NTSC convertor 44. The NTSC convertor 44 is an electrical circuit for converting the video signal demodulated by the compressed data demodulation circuit 42 into a commercial television signal (NTSC). The NTSC image signal converted by the NTSC convertor 44 is sent to the video mixer 24 of the commander 10.

The CPU 38 is for controlling overall operation of the disk player devices 30, based on the control programs stored in the ROM 33 and the RAM 34.

Figure 5:
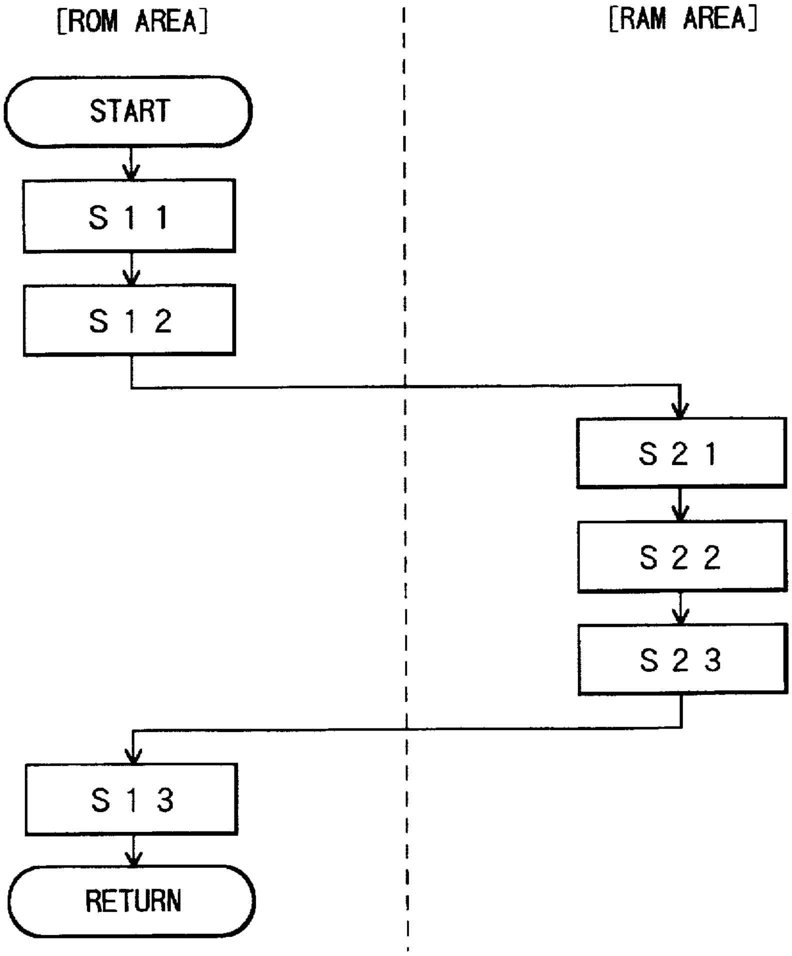
FIG. 5 is a flowchart showing processes implemented by the CPU for reproduction.

The program stored in the ROM 33 is designed with several program paths that enter into a program stored within the RAM 35. FIG. 5 shows one example of such a program path. As shown in the figure, the path proceeds from step S11 to S12 of a program stored in the ROM 33. At S12, a jump command is executed or a parameter of some value is generated that causes the program to jump to step S21, which is a step of the program stored within the RAM 35. The program path then proceeds to S22 and S23 of the program in the RAM 35 and then back to the program in the ROM 33. The program path is thus designed to pass through the program stored in the RAM 35.

Figure 4:
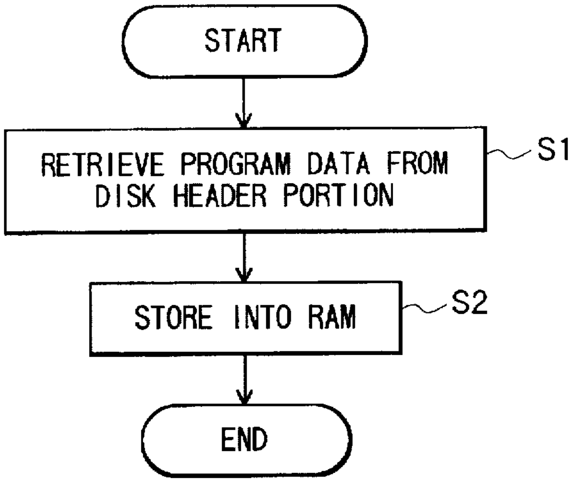
FIG. 4 is a flowchart showing processes implemented by a CPU in the disk player device shown in FIG. 3 at the start of the karaoke system.

The ROM 33 also stores a system control program, as shown in FIG. 4, which is executed when the karaoke system is turned on. This system control includes: a step S1 for controlling the CPU 38 to retrieve program data stored in the header portion of a video disk that is presently set in the player 34*a*; and a step S2 for storing this data into the RAM 35. Thus, this system control program is for controlling the CPU 38 to control the player 34*a* to pick up the program data from the header portion of the video disk and to directly store the program data into the RAM 34.

Figure 6:
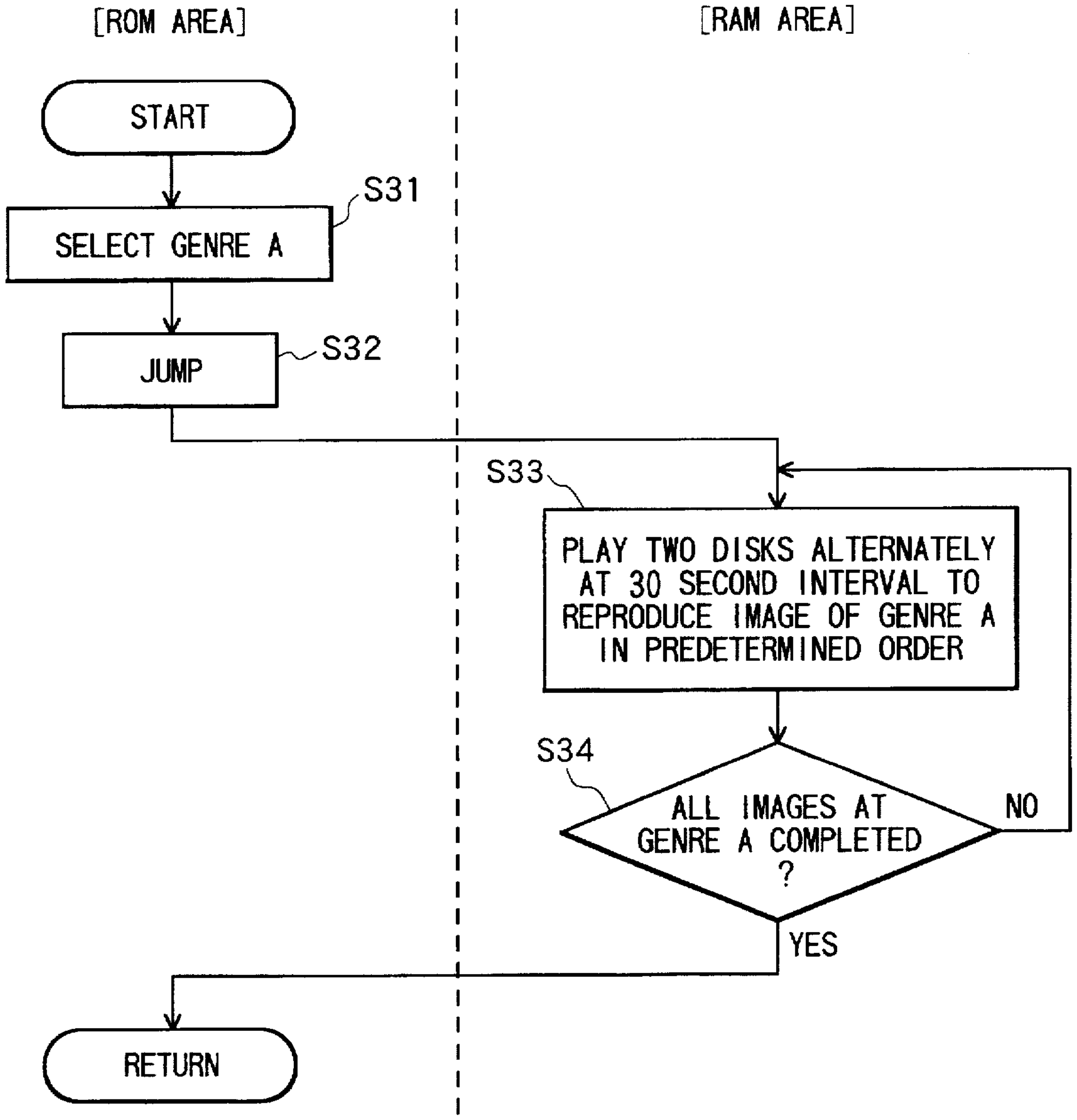
FIG. 6 is one example of a flowchart showing reproduction processes implemented by the CPU.

Here will be described an example where the RAM 35 originally stores a reproduction control program for playing the players 34*a* and 34*b* alternately for 30 second intervals to reproduce the commander-indicated genre images in a predetermined order. As shown in FIG. 6, the RAM 35 stores a step S33 for executing this reproducing operation and a step S34 for judging whether all the video units of the commander-indicated genre are reproduced from the disks on the players. The program path of the program stored in the ROM 33 is designed to pass through S33 and S34 in the program in the RAM 34.

When the program path of the program in the ROM reaches the video reproduction routine shown in FIG. 6, the program path reaches $31, wherein image genre A (for example, summer seasonal genre) is selected as indicated by the commander 10. The program path then proceeds to S32, where a jump command is executed to jump the program path into an address routine stored in the RAM area. Then, S33 in the RAM area is executed to play the players 34*a* and 34*b* alternately at 30 second intervals and to reproduce images in the predetermined order from the disks. The routine then proceeds to S34, still in the RAM area, so as to judge whether all the image units of genre A have been reproduced from the disks. The routine is designed at S34 to return back to an address routine within the ROM 33 when all the image chapters of genre A are reproduced.

To operate the image karaoke system 1, a user chooses a song he/she wants to sing by manipulating the operation panel 14 of the commander 10 or the remote controller 14*a*. Then, the controller 12 starts retrieving the song data for the-selected song from the hard disk 20. The controller 12 transmits information on the image genre of the selected song through the SIO circuit 16 to the STO circuit 32 of the disk player device 30. Then, the controller 12 consecutively retrieves lyric data and music data of the song data, in accordance with the progress of the song. The controller 12 transfers the lyric data to the video mixer 24. The controller 12 transfers the music data to the MIDI sound source 22. The lyric data and the music data are thus retrieved and supplied to the corresponding devices, in synchronization.

In the disk player device 30, the CPU 38 executes the program of FIG. 6 to control the first and second players 34*a* and 34*b* so as to select and reproduce chapters of the corresponding genre in the predetermined order from the reproduction video disks located thereon. The switching circuit 36 is controlled by the CPU 38 to switchingly drive the players 34*a* and 34*b* to reproduce and transfer the video data to the data reading circuit 40, in alternation. The video data thus transferred to the data reading circuit 40 is further transferred to the demodulation circuit 42 and the NTSC converter 44 where the video data is transformed into NTSC video signals. The NTSC video signals are transferred from the NTSC converter 94 to the video mixer 24 of the commander 10. Thus, the disk player device 30 serves to reproduce video data from the video disks, produces the NTSC video signals, and transfers the NTSC video signals to the video mixer 29.

In the video mixer 24, the NTSC video signals are superimposed with the lyric data supplied from the hard disk 20, in synchronization with the music data, to produce composite video signals that are displayed on the monitor television 56. The NTSC video signals become the background scene on the monitor television 56. The thus obtained background image is of a genre that properly matches the theme, content, and the like of the song selected by the user.

The music data supplied to the MIDI sound source 22 is transformed into analog instrumental music signals. The analog music signals are sent to the amplifier/mixer 50 where they are electrically amplified and mixed at an appropriate rate with the voice of the user who is singing the song into the microphone 54 in time with the music while referring to the lyrics. The signals with the music and voice mixed therein are outputted by the speaker 52.

Figure 7:
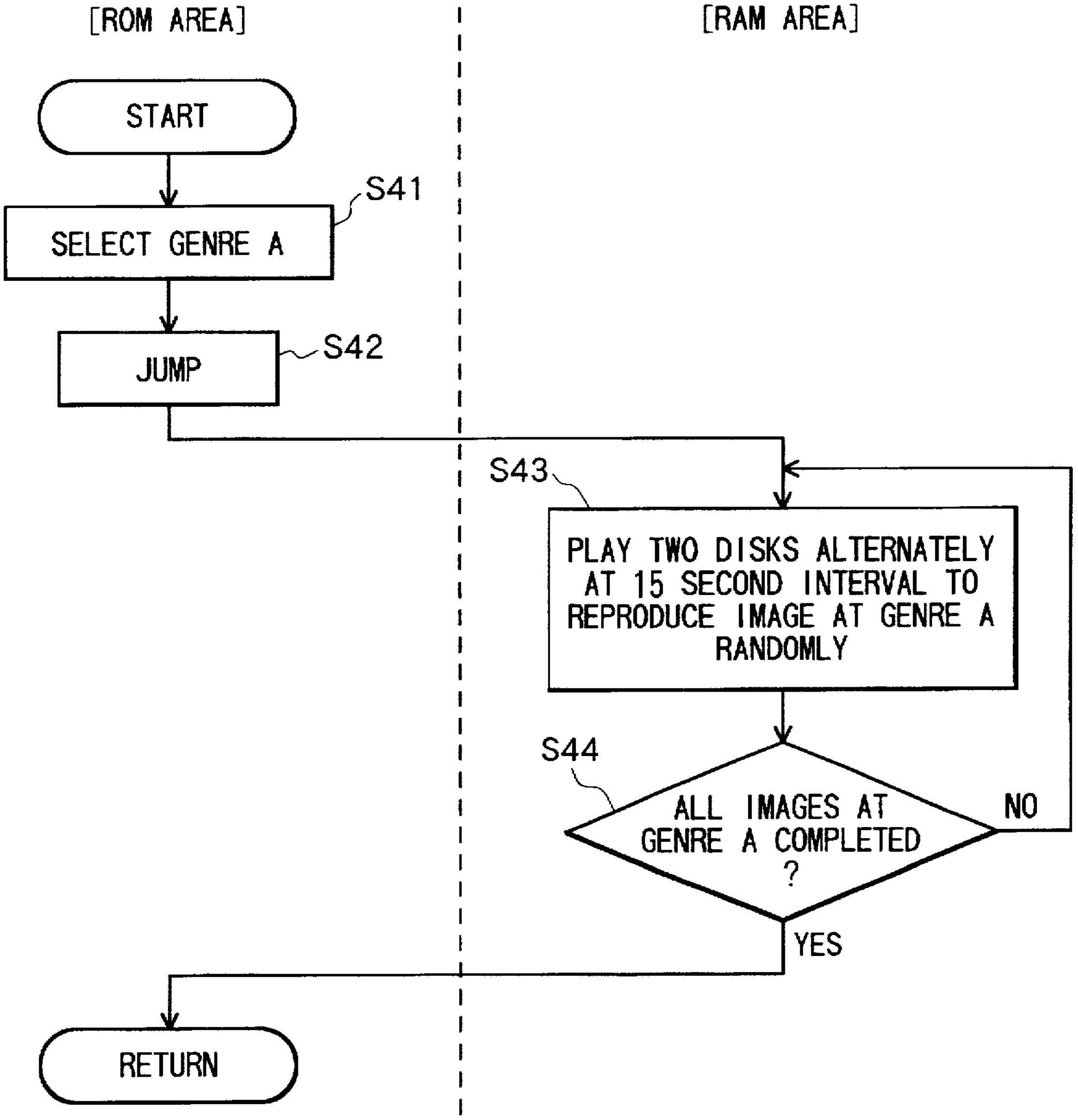
FIG. 7 is one example of a flowchart showing modified reproduction processes implemented by the CPU when a video disk set on the disk player stores the program for these processes.

Now assume that a disk player device 30 is put on the market with a program including the above-described steps S33 and S34 in the RAM 34: After the sale of this device, it might become desirable to shorten the switching interval from 30 seconds to 15 seconds and to change the reproduction order from the predetermined order into a random order. These modifications would provide a greater variety of background images to give more interest to a karaoke user. According to the present invention, in order to make this modification, a video disk is prepared to store a control program modified to include a 15 second switching interval and a random reproduction order. More specifically, as shown in FIG. 7, the header portion stores a step S43 for executing this modified reproducing operation and a step S44 for judging whether all the image chapters of the commander-indicated genre have been reproduced. When this video disk is mounted on the player 34*a* and when the video reproduction device 30 is turned on, the program data of the steps S43 and S44 are retrieved from the video disk and stored in the RAM 34 in accordance with the system program of FIG. 4. As a result, the originally-stored steps S33 and S34 are replaced with the modified steps S43 and S44. The control path of the program stored in the ROM is therefore changed to pass through the steps S43 and S44 as shown in FIG. 7, thereby providing the modified reproduction operation.

Thus, the steps S33 and S34 originally stored in the RAM 34 can be replaced by any desired control steps, by simply mounting on the player 34*a* a disk storing the desired control steps. Accordingly, the reproduction manner determined originally by the steps S33 and S34 can be easily modified in any desired manner.

As described above, according to the present invention, the program stored in the ROM 33 is designed to have a program path passing through the RAM 35. When the karaoke system is started, program data is retrieved from the disk and stored in the RAM 35. As a result, the CPU controls the disk players to reproduce images in a desired manner represented by the program data.

The program stored in the ROM 33 is preferably designed to have a plurality of program paths passing through the RAM 35 so that a greater number of modifications is possible.

The above-described example is directed to modification in the switching time interval and in the reproduction order. When a bug is generated in programs originally stored in the device, it is possible to easily correct the bug by simply setting a video disk storing the corrected program.

In the above example, the commander 10 is designed to determine the image genre appropriate for the selected song. However, the commander 10 may be designed to simply transmit the information on the selected song to the disk player device 30, where the CPU 38 determines the genre according to the supplied information. In this case, the control program for the genre determination should preferably be stored in the RAM 34. Each disk may store a genre determining control program that corresponds to the genre classifying manner used for preparing the video units in the disk. Such a disk could provide background images that match karaoke songs well.

As described above, according to the present invention, the video disk stores not only video data but also program data of the reproduction control desired to be conducted by the video reproduction device. When the video disk is set in the video reproduction device, the control program is retrieved from the disk and stored in the device. Thus, it is possible to easily cause the device to perform a desired reproduction operation, by simply setting the video disk in the device.

While the invention has been described in detail with reference to the specific embodiment thereof, it would be apparent to those skilled in the art that various changes and modifications may be made therein without departing from the spirit of the invention.

The above-described embodiment employs the CD-sized video disks in which data is stored in compressed form and therefore which can store one hour of images in total in a compact size. Accordingly, the disk player device 30 storing the plurality of CD disks can be made compact. However, it is possible to employ general types of video disks. In this case, the video data and the program data would be stored in the general types of video disks. The program data is retrieved from the disks and stored in the RAM 35.

It the present embodiment, images are reproduced from disks by the first and second players 34*a* and 34*b*. However, it is possible to reproduce images from one disk using only one player.

In the present embodiment, the video data is constructed to represent a plurality of separately-edited chapters. However, video data may be structured to represent various types of images. Simply reproducing video data from two video disks in alternation at a desired time interval can provide a series of images that is similar to a series of chapters of the desired time interval. In this case, decreasing the time interval can provide a greater variety of background images.

What is claimed is:

1. A video reproduction device for reproducing video data from a video disk, the video disk storing the video data and a reproduction control program data representative of a desired reproduction manner in which the video data is desired to be reproduced from the video disk, the device comprising:

disk reproduction means for retrieving video data from video disk set thereon, the video disk storing the video data and a reproduction control program data representative of a desired reproduction manner in which the video data is desired to be reproduced from the video disk;

a program read-only memory for storing in advance a control program for controlling the disk reproduction means;

a program read/write memory in which a program can be written in and read from;

means for modifying said control program comprising:

means to automatically extract the reproduction control program data from the video disk, and means to store the extracted reproduction control program data in the program read/write memory, wherein the extracted reproduction control program data modifies said control program; and control means for controlling the disk reproduction means, based on the modified control programs the video data being retrieved from the video disk in the desired reproducing manner represented by the reproduction control program data.

2. A video reproduction device of claim 1, wherein the control program stored in the program read-only memory is formed with a program path which retrieves the reproduction control program data from the video disk and stores said reproduction control program data in the program read/write memory and which then proceeds to execute said reproduction control program data stored in the program read/write memory, the control means executing the control program stored in the program read-only memory, thereupon executing the reproduction control program data stored in the program read/write memory.

3. A video reproduction device of claim 1, wherein the reproduction control program data represents a reproduction pattern in which the video data is desired to be reproduced from the video disk, the control means controlling the disk reproduction means based on the reproduction control program data written in the program read/write memory, so as to retrieve the video data from the video disk in the desired reproducing pattern.

4. A video reproduction device of claim 3, wherein the disk reproduction means includes several video disk players each for receiving a video disk and for reproducing video data from the video disk, and wherein the reproduction control program data represents a control for switchingly playing the disk players at a desired time interval, the control means controlling the disk reproduction means based on the reproduction control program data written in the program read/write memory, so as to switchingly play the disk players at the desired time interval.

5. A video reproduction device of claim 2, wherein the video data represent a plurality of video units each being edited into a predetermined time period video, and wherein the reproduction control program data represents information on a genre classifying manner in which the plurality of video units are classified into several genres, the control means controlling the disk reproduction means based on the reproduction control program data written in the program read/write memory, so as to reproduce several video units of a desired genre that is determined based on the genre classifying manner.

6. A video reproduction device of claim 5, wherein the reproduction control program data represents a manner of selecting the several video units of the desired genre out of the plurality of video units, based on the genre classifying manner.

7. A method for reproducing video data from a video disk, the video disk storing the video data and a reproduction control program data representative of a desired reproduction manner in which the video data is desired to be reproduced from the video disk, the method comprising the steps of:

automatically extracting the reproduction control 7 program data from the video disk;

storing the reproduction control program data into a memory, wherein said stored reproduction control modifies a control program; and retrieving video data from the video disk, directed by the modified control program, the video data being retrieved from the video disk in the desired reproducing manner represented by the reproduction control program data.

8. A method of claim 7, wherein the video data is retrieved from the video disk with a video reproduction device, the video reproduction device including a disk player, a program read-only memory for storing in advance a control program for controlling the disk player, and a program read/write memory in which a program can be written in and read from, wherein the reproduction control program data retrieving step includes the steps of:

locating a video disk on the disk player;

controlling the disk player to retrieve the reproduction control program data from the video disk: and storing the reproduction control program data into the program read/write memory, and wherein the video data retrieving step includes the step of controlling the disk player to retrieve video data from the video disk set thereon, based on both the control program stored in the program read-only memory and the reproduction control program data presently stored in the program read/write memory, so as to retrieve the video data from the video disk in the desired reproducing manner represented by the reproduction control program data.

9. A method of claim 8, wherein the video disk comprises:

a first part for storing the video data representative of video images; and a second part for storing the reproduction control program data representing the desired manner of reproducing the video data from the first part.

10. A method of claim 9, wherein the control program stored in the program read-only memory is formed with a program path which retrieves a program data from the video disk and stores said program data in the program read/write memory and which then proceeds to execute the reproduction control program data presently stored in the program read/write memory, and wherein the disk player is controlled to retrieve video data from the video disk set thereon, based on the control program stored in the program read-only memory, thereupon executing the reproduction control program data stored in the program read/write memory.

* * * * *